UNITED STATES PATENT OFFICE.

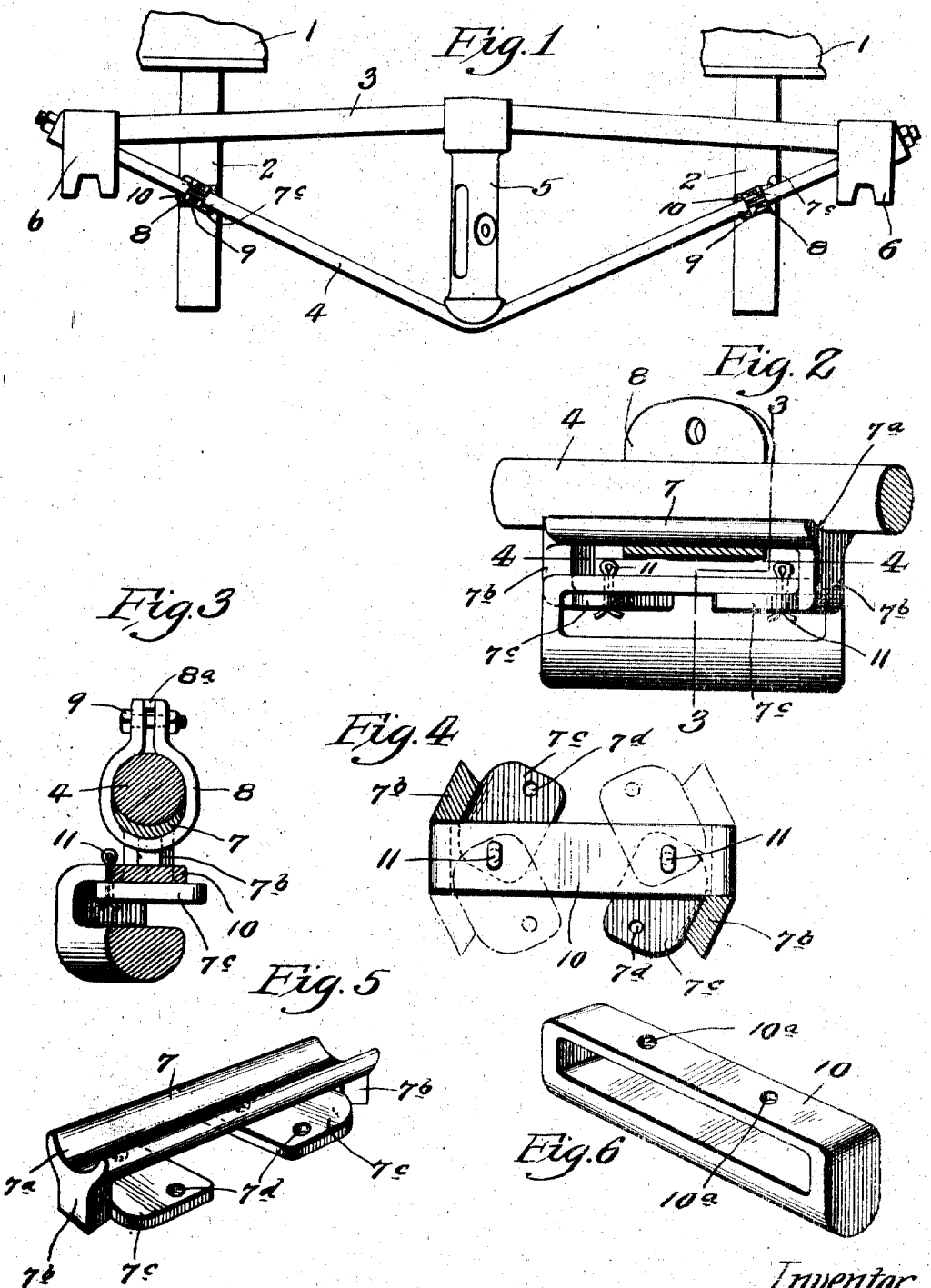

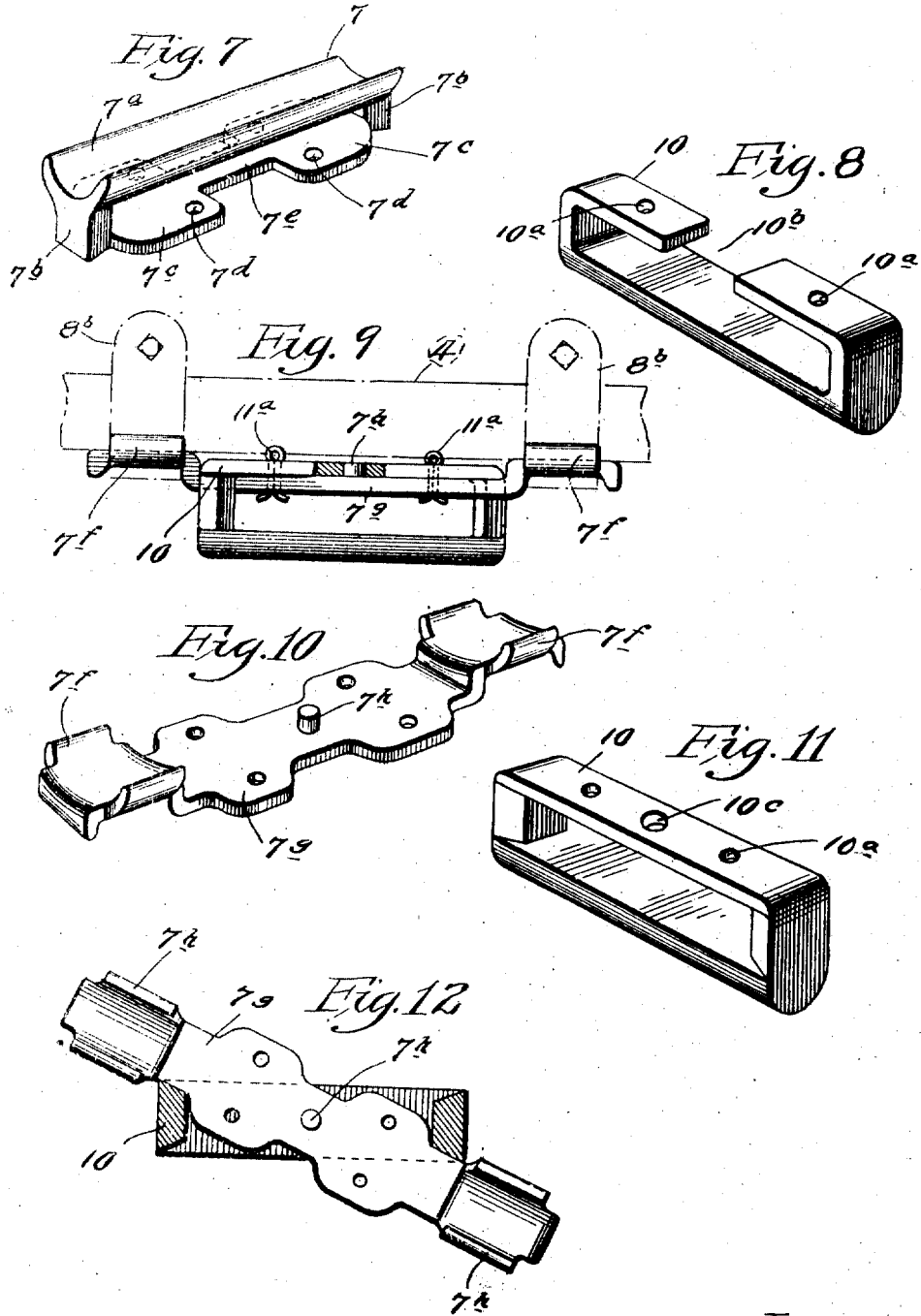

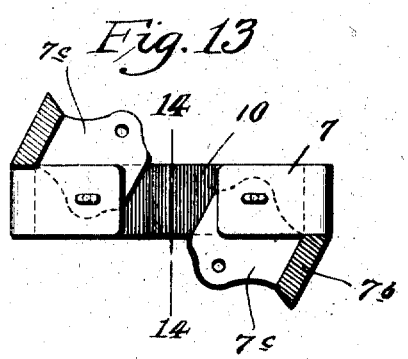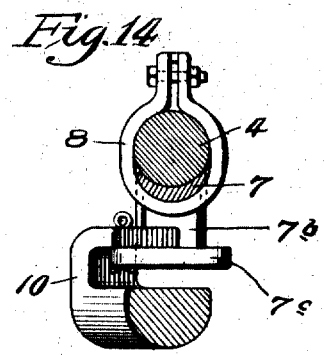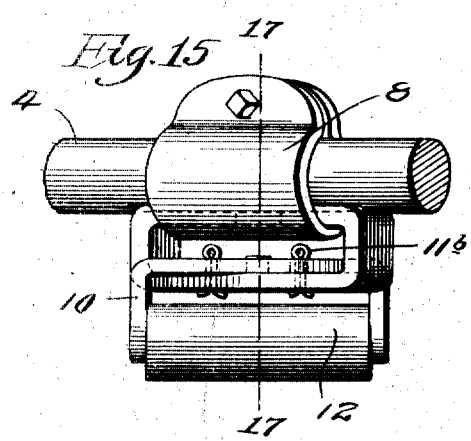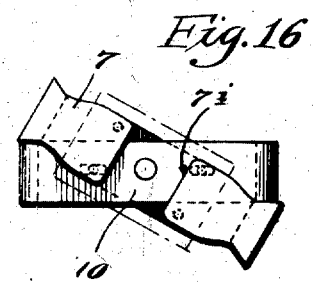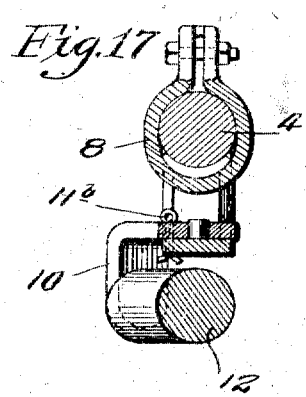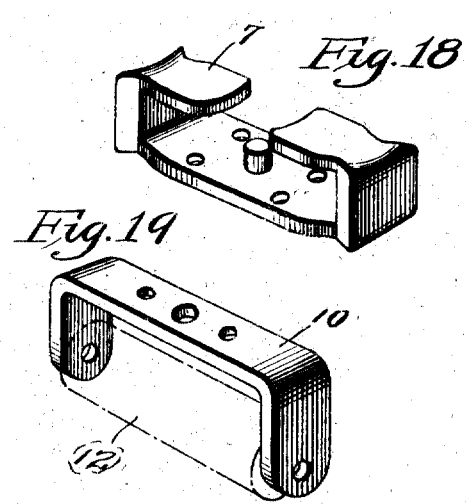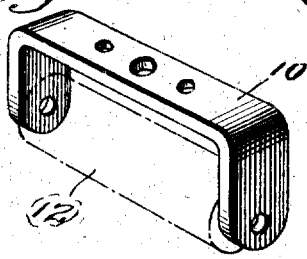

FREDERICK R. CORNWALL, OF ST. LOUIS, MISSOURI, ASSIGNOR TO CHICAGO RAILWAY EQUIPMENT COMPANY, OF CHICAGO, ILLINOIS, A CORPORATION OF ILLINOIS.

FOURTH-POINT SUPPORT FOR BRAKE-BEAMS.

1,277,196.  Specification of Letters Patent.  Patented Aug. 27, 1918.

Application filed March 11, 1918. Serial No. 221,711.

*To all whom it may concern:*

Be it known that I, FREDERICK R. CORNWALL, a citizen of the United States, residing at St. Louis, Missouri, have invented a certain new and useful Improvement in Fourth-Point Supports for Brake-Beams, of which the following is a full, clear, and exact description, such as will enable others skilled in the art to which it appertains to make and use the same, reference being had to the accompanying drawings, forming part of this specification, in which—

Figure 1 is a plan view of a brake beam showing my improved fourth-point support arranged thereon.

Fig. 2 is a side elevational view of one form of my improved reversible fourth point support.

Fig. 3 is a sectional view on line 3—3 of Fig. 2.

Fig. 4 is a horizontal sectional view on line 4—4 of Fig. 2.

Fig. 5 is a detail view of the saddle member.

Fig. 6 is a detail view of the bearing or rubbing shoe.

Fig. 7 is a detail view of a saddle member designed for use in connection with another form of my reversible fourth point support.

Fig. 8 is a detail view of the bearing or rubbing shoe used in connection with the saddle shown in Fig. 7.

Fig. 9 is a side elevational view partly in section of another modified form.

Fig. 10 is a detail view of the saddle member shown in Fig. 9.

Fig. 11 is a detail view of the bearing or rubbing shoe shown in Fig. 9.

Fig. 12 is a top plan view partly in horizontal section of the form shown in Fig. 9.

Fig. 13 is a top plan view partly in section of another modified form.

Fig. 14 is a sectional view on line 14—14 of Fig. 13.

Fig. 15 is a side elevational view of another modified form.

Fig. 16 is a plan view of the saddle and roller carrying member shown in Fig. 15.

Fig. 17 is a sectional view on line 17—17 of Fig. 15.

Fig. 18 is a detail view of the saddle member shown in Fig. 15.

Fig. 19 is a detail view of the roller carrying member shown in Fig. 15.

This invention relates to a new and useful improvement in reversible fourth point supports for brake beams. Heretofore, so far as I am aware, fourth point supports for brake beams have been made in pairs, that is, different patterns have been used for the fourth point supports which are applied at opposite ends of the beams, usually designated as the right and lefthand end of the beam.

The object of my present invention is to enable the use of a single pattern for fourth point supports capable of use or attachment to opposite ends of the beam thereby reducing the original cost and number of parts necessary to be carried in repair shops.

Another object is to enable the bearing or rubbing shoe to be detached and removed without the necessity of dismantling the clamping members from the beam.

In the drawings, 1 indicates a spring plank of the truck and 2 the fourth point track supports. 3 is the compression member of the brake beam, 4 the tension member thereof, 5 the strut, and 6 the brake heads. A brake beam composed of these elements may be of any well known construction.

In all forms of my invention, my improved fourth point support comprises a saddle member, a clamping member and a reversible bearing or rubbing element so mounted with relation to the saddle member that its position may be changed to adapt it for use at either end of the beam. Means are provided for holding this rubbing or bearing member in its changed position. While I have shown the clamping member as being separate from the saddle, it is obvious that the saddle may be provided with integral clamping jaws and in this manner be directly clamped upon a part of the beam.

In the drawings, in Figs. 1 to 6 inclusive, 7 indicates the saddle member (see Fig. 5) which is provided with a seat $7^a$ in its upper face to receive the tension member 4. From the ends of this saddle member depend posts $7^b$ whose side edges are preferably cut away at an angle or beveled, as shown; and from the lower ends of these post wings $7^c$ extend inwardly toward each other, said wings being provided with openings $7^d$. 8 indicates a clamping member in the form of an open loop whose ends extend parallel to each other, one of which ends or jaws is preferably provided with a spacing lug $8^a$ so that when the nut on the bolt 9 is screwed home to clamp the loop 8 in position, it will cause said loop to tightly clamp the saddle member onto the tension member.

10 indicates a rubbing or bearing shoe (see Fig. 6) which is provided with openings 10ᵃ designed to register respectively with diagonally disposed openings 7ᵈ on the wings 7ᶜ depending upon whether the wearing shoe is to be used at the right or lefthand side of the beam. The wings 7ᶜ are spaced apart sufficiently at the middle so as to permit the upper cross member of the shoe 10 to be placed in position above the wings and then by a turning movement located over the wings so as to register the openings 10ᵃ with the diagonally disposed openings 7ᵈ, depending upon which end the beam or shoe is used in which cotter pins 11 are passed through the registering opening to hold the shoe in position.

The construction shown in Figs. 7 and 8 is substantially the same as that disclosed in Figs. 1 to 6, except that the wings 7ᶜ are connected by a bridge member 7ᵉ and the wearing shoe 10 has its top wall cut away as at 10ᵇ so that it may be assembled from beneath the bridge 7ᵉ passing through this opening after which the wearing shoe is turned to the desired position.

In Figs. 9 to 12, inclusive, the saddle member has two end extensions 7ᶠ for receiving the clamping loops 8ᵇ, there being a connecting bar 7ᵍ spaced from the tension member 4 and provided with a pivot pin 7ʰ at its center. The wearing or rubbing shoe 10 is substantially the same in this form as is shown in Figs. 1 to 6, except that it is provided with a medial opening 10ᶜ to receive the pivot pin 7ʰ. In assembling the parts of this form of my invention, the end of the saddle member is passed through the opening of the shoe member and the pins 7ʰ located in the openings 10ᶜ. The clamping members 8ᵇ are now arranged in position to clamp the saddle member, after which the shoe is adjusted to its desired position and the cotter pins 11ᵃ passed through the registering openings, as before described, for the purpose of holding the shoe in its proper angular relation to the saddle member.

In Figs. 13 and 14, I have shown a form of my invention in which there is a space between the wings of the saddle member and also an opening in the upper cross bar of the shoe so as to lighten the shoe 10. This construction reduces the amount of metal entering into the construction.

In Figs. 15 and 16, I have shown another modified form of my invention in which the upper cross bar of the saddle member, i. e., the one containing the saddle seat, is cut away as at 7¹, so that the reversible member 10 may be slipped in position from above and held in its adjusted position by means of the cotter pins 11ᵇ, as before described. The reversible member 10 in this form is provided with perforated ears or lugs at each end in which is mounted the journal or axle of the roller 12. This roller thus forms an anti-frictional reversible fourth point support.

What I claim is:

1. A reversible fourth point support for brake beams comprising a member designed to be secured to the brake beam, and a bearing member having an angular adjustment with respect to said first-mentioned member.

2. A reversible fourth point support for brake beams comprising a member adapted to be secured to a part of the brake beam, a bearing member having angular adjustment with respect to said first-mentioned member, and means for holding said bearing member in its adjusted position.

3. A fourth point support for brake beams comprising a member designed to be secured to a part of the brake beam, in combination with a detachable bearing member supported upon said first-mentioned member and capable of angular adjustment relative thereto.

4. A reversible fourth point support for brake beams comprising a member designed to be secured to a part of the brake beam, in combination with a bearing member which may be turned with relation to said first-mentioned member so as to adapt it for use at either end of the beam.

5. A fourth point support for brake beams comprising a member adapted to be secured to a part of the brake beam, in combination with a bearing member detachably mounted with relation to said first-mentioned member and angularly adjustable with respect thereto, and means for locking said bearing member in adjusted position.

In testimony whereof I hereunto affix my signature this second day of March, 1918.

FREDERICK R. CORNWALL.